US007381339B2

(12) United States Patent
Aronstein et al.

(10) Patent No.: US 7,381,339 B2
(45) Date of Patent: Jun. 3, 2008

(54) INCREASED YIELD OF CUBIC CRYSTALLINE OPTICAL ELEMENTS BY CRYSTAL ORIENTATION

(75) Inventors: David L. Aronstein, Fairport, NY (US); Douglas S. Goodman, Pittsford, NY (US); Paul M. Then, Victor, NY (US)

(73) Assignee: Corning Incorporated, Corning, NY (US)

( * ) Notice: Subject to any disclaimer, the term of this patent is extended or adjusted under 35 U.S.C. 154(b) by 704 days.

(21) Appl. No.: 10/947,100

(22) Filed: Sep. 22, 2004

(65) Prior Publication Data

US 2006/0061864 A1 Mar. 23, 2006

(51) Int. Cl.
*B29D 11/00* (2006.01)

(52) U.S. Cl. .............................. 216/24; 216/26; 216/31; 359/352; 359/359; 359/497; 359/499; 359/754

(58) Field of Classification Search .................. 216/24; 359/352
See application file for complete search history.

(56) References Cited

U.S. PATENT DOCUMENTS 6,690,514 B2 * 2/2004 Davydov .................... 359/495

OTHER PUBLICATIONS

John Burnett, Zachary Levine, Eric Shirley, and John Bruning entitled "Symmetry of spatial-dispersion-induced birefringence and its implications for $CaF_2$ ultraviolet optics", Society of Photo-Optical Instrumentation Engineers, J. Microlith., Microfab., Microsyst. p. 213-224, Oct. 2002.

* cited by examiner

*Primary Examiner*—Nadine Norton
*Assistant Examiner*—Maki Angadi
(74) *Attorney, Agent, or Firm*—Timothy M. Schaeberle

(57) ABSTRACT

Increased yield of optical elements from cubic crystal rods, such as made of calcium fluoride, is made possible by orienting the optical elements for supporting the propagation of light along one of the <1 1 $\bar{2}$>, <1 2 1>, or <$\bar{2}$ 1 1> alternative crystal axis, which extend perpendicular to a main <1 1 1> crystal axis. A cleave is taken through the crystal rod along a primary crystal plane {1 1 1} normal to the <1 1 1> main axis. One of the <1 1 $\bar{2}$>, <1 $\bar{2}$ 1>, or <$\bar{2}$ 1 1> alternative crystal axes is located by optical inspection and indicated on the crystal rod with an orientation label. Additional cuts are taken parallel to the {1 1 1} primary crystal plane to divide the crystal rod into disks each containing a portion of the orientation label. The disks can be cut again and sides formed perpendicular to the {1 1 1} primary crystal plane with regard to the orientation labels for forming optical elements, such as prisms, oriented for supporting the propagation of polarized light along one of the <1 1 $\bar{2}$>, <1 $\bar{2}$ 1>, and <$\bar{2}$ 1 1 > alternative crystal axes.

30 Claims, 2 Drawing Sheets

INCREASED YIELD OF CUBIC CRYSTALLINE OPTICAL ELEMENTS BY CRYSTAL ORIENTATION

BACKGROUND OF THE INVENTION

1. Field of the Invention

The invention relates to cubic crystalline optical elements, particularly calcium fluoride, in forms such as prisms for propagating highly collimated, linearly polarized light along predetermined crystal axes and to the manufacture and use of such cubic crystalline optical elements.

2. Description of Related Art

The short-wavelength high-photon-energy content of deep ultraviolet (UV) light (wavelengths between approximately 120 nanometers and 250 nanometers) significantly limits the number of materials capable of transmitting ultraviolet light and amplifies weaknesses in the limited number of materials that do transmit such ultraviolet light. Most ordinary optical materials are either insufficiently transmissive or subject to breakdown by absorption.

Calcium fluoride ($CaF_2$) is among the optical materials capable of transmitting deep UV light. Despite calcium fluoride's highly symmetric cubic crystalline structure, calcium fluoride exhibits intrinsic birefringence at the short wavelengths. Different polarization components of the ultraviolet light experience different refractive indices depending upon both the direction of polarization and the direction of propagation of the light through the crystal material. A description of the nature of the intrinsic birefringence in calcium fluoride crystals is found in a paper by John Burnett, Zachary Levine, Eric Shirley, and John Bruning entitled "Symmetry of spatial-dispersion-induced birefringence and its implications for $CaF_2$ ultraviolet optics", Society of Photo-Optical Instrumentation Engineers, J. Microlith., Microfab., Microsyst. p. 213-224, October 2002, which is hereby incorporated by reference.

There are 14 crystal axes, which can be referenced according to Miller indicies, along which deep ultraviolet light can be propagated through calcium fluoride crystals without encountering intrinsic birefringence effects. These include propagations in both directions along the three cube axes (i.e., the family of <1 0 0> directions) and along the four cube body diagonals (i.e., the family of <1 1 1> directions, referred to herein as the <1 1 1> main axis). The <1 1 1> main axis is a normal to the natural {1 1 1} cleavage plane of calcium fluoride crystals, referred to herein as the {1 1 1} primary plane. The {1 1 1} primary plane is the plane along which the crystal tends to break first when struck. Optical elements made from calcium fluoride crystals are generally oriented for propagation of light along the <1 1 1> main axis, because the natural cleavage of calcium fluoride crystals presents planar surfaces normal to the crystal's <1 1 1> main axis.

Prisms for use in the deep UV are frequently cut out of calcium fluoride crystals grown in rod form with either ordered or randomly oriented crystal axes. One end of the rods is cleaved along the {1 1 1} primary plane (normal to the <1 1 1> main axis) to provide a basis for prism orientation. The sides of the oriented rods are cut and polished to form slabs. A line of prisms is traced on the slab, and the slab is further cleaved for orienting each of the prisms to support the propagation of light along the <1 1 1> main axis of the crystal.

The crystal rods are expensive to manufacture, considerable waste is associated with the formation of the slabs, and a separate cleave is generally required for each prism. A higher yield from these rods would be desirable.

BRIEF SUMMARY OF THE INVENTION

The invention contemplates the propagation of highly collimated, linearly polarized, deep UV light along cubic crystal axes that are oriented perpendicular to the <1 1 1> main axis along which light is usually propagated. The alternative axes, designated as <1 1 $\bar{2}$>, <1 $\bar{2}$ 1> and <$\bar{2}$ 1 1> axes, occupy even 60° intervals about the <1 1 1> main axis. Although unpolarized light propagating along the <1 1 $\bar{2}$>, <1 $\bar{2}$ 1> and <$\bar{2}$ 1 1> alternative axes is subject to intrinsic birefringence effects, properly oriented polarized light propagating along the same alternative <1 1 $\bar{2}$>, <1 $\bar{2}$ 1> and <$\bar{2}$ 1 1> axes experiences little polarization conversion (change) though a modest range of angular misalignments and crystal stress variations. The electric field vectors of the properly polarized light are oriented substantially perpendicular to the <1 1 1> main axis (i.e., aligned substantially perpendicular to the {1 1 1} primary plane).

Increased yield from cubic crystal bodies is possible for optical element designs in which the direction of intended light propagation lies along one of the <1 1 $\bar{2}$>, <1 $\bar{2}$ 1> and <$\bar{2}$ 1 1> alternative axes. The cubic crystal bodies can be grown as usual with either ordered or randomly oriented crystal axes, and the crystal axes can be referenced as usual by first cleaving the crystal body along the {1 1 1} primary plane defined as normal to the <1 1 1> crystal axis. However, in accordance with the invention, inspection, such as by x-ray diffractometry, determines the orientation of an alternative crystal plane {1 1 $\bar{2}$}, {1 $\bar{2}$ 1}, or {$\bar{2}$ 1 1} defined as normal to one of the <1 1 $\bar{2}$>, <1 $\bar{2}$ 1>, and <$\bar{2}$ 1 1> alternative crystal axes.

The crystal body is divided into a plurality of optical elements each having at least one surface substantially parallel to the {1 1 1} primary crystal plane and at least one surface substantially perpendicular to the primary crystal plane {1 1 1}. The at least one surface substantially perpendicular to the {1 1 1} primary crystal plane is oriented with respect to one of the {1 1 $\bar{2}$}, {1 $\bar{2}$ 1}, or {$\bar{2}$ 1 1} alternative crystal planes so that an intended direction of propagation of light refracted into each of the optical elements is along the one of the <1 1 $\bar{2}$>, <1 $\bar{2}$ 1>, and <$\bar{2}$ 1 1> alternative crystal axes.

Preferably, a plurality of cuts substantially parallel to the {1 1 1} primary crystal plane along even increments of the crystal body length produce a plurality of commonly oriented slabs, preferably in the form of disks. Each of the disks has a top and bottom surface connected by a peripheral surface corresponding to a peripheral surface of the crystal body. The peripheral surfaces of the commonly oriented disks are finished to produce at least one optical surface in each of the disks oriented substantially perpendicular to the {1 1 1} primary crystal plane at a predetermined inclination to the one {1 1 $\bar{2}$}, {1 $\bar{2}$ 1}, or {$\bar{2}$ 1 1} alternative crystal plane. The at least one surface substantially perpendicular to the {1 1 1} primary crystal plane is preferably inclined with respect to the {1 1 $\bar{2}$}, {1 $\bar{2}$ 1}, or {$\bar{2}$ 1 1} alternative crystal plane so that a highly-collimated beam of linearly-polarized light refracts into its intended direction of propagation of light through each of the optical elements along the one <1 1 $\bar{2}$>, <1 $\bar{2}$ 1>, or <$\bar{2}$ 1 1> alternative crystal axis.

For purposes of further increasing the yield from the crystal body, the new orientations enable the disks to be divided into a number of parts with each part fashioned into a separate optical element. The periphery of the crystal body is preferably marked to identity the orientation of the {1 1 $\bar{2}$}, {1 $\bar{2}$ 1}, or {$\bar{2}$ 1 1} alternative crystal plane. The markings allow the intended optical elements to be traced onto the individual disks oriented as desired to the one <1 1 $\bar{2}$>, <1 $\bar{2}$ 1>, or <$\bar{2}$ 1 1> alternative crystal axis and for each of the disks to be cut into oriented parts for separating adjacent surfaces of the intended optical elements.

The invention is particularly applicable to the manufacture of prisms. Two faces of the prisms can be formed from top and bottom surfaces of the disks cut substantially parallel to the {1 1 1} primary crystal plane, and side faces of the prisms can be formed in the peripheral surfaces of the disks substantially perpendicular to the {1 1 1} primary crystal plane. Each of the disks can be cut in planes substantially perpendicular to the {1 1 1} primary crystal plane for forming another crystal side face, particularly as an entrance face oriented for directing light along the alternative <1 1 $\bar{2}$>, <1 $\bar{2}$ 1>, or <$\bar{2}$ 1 1> crystal axis.

BRIEF DESCRIPTION OF THE SEVERAL VIEWS OF THE DRAWING(S)

DETAILED DESCRIPTION OF THE INVENTION

Figure 1:
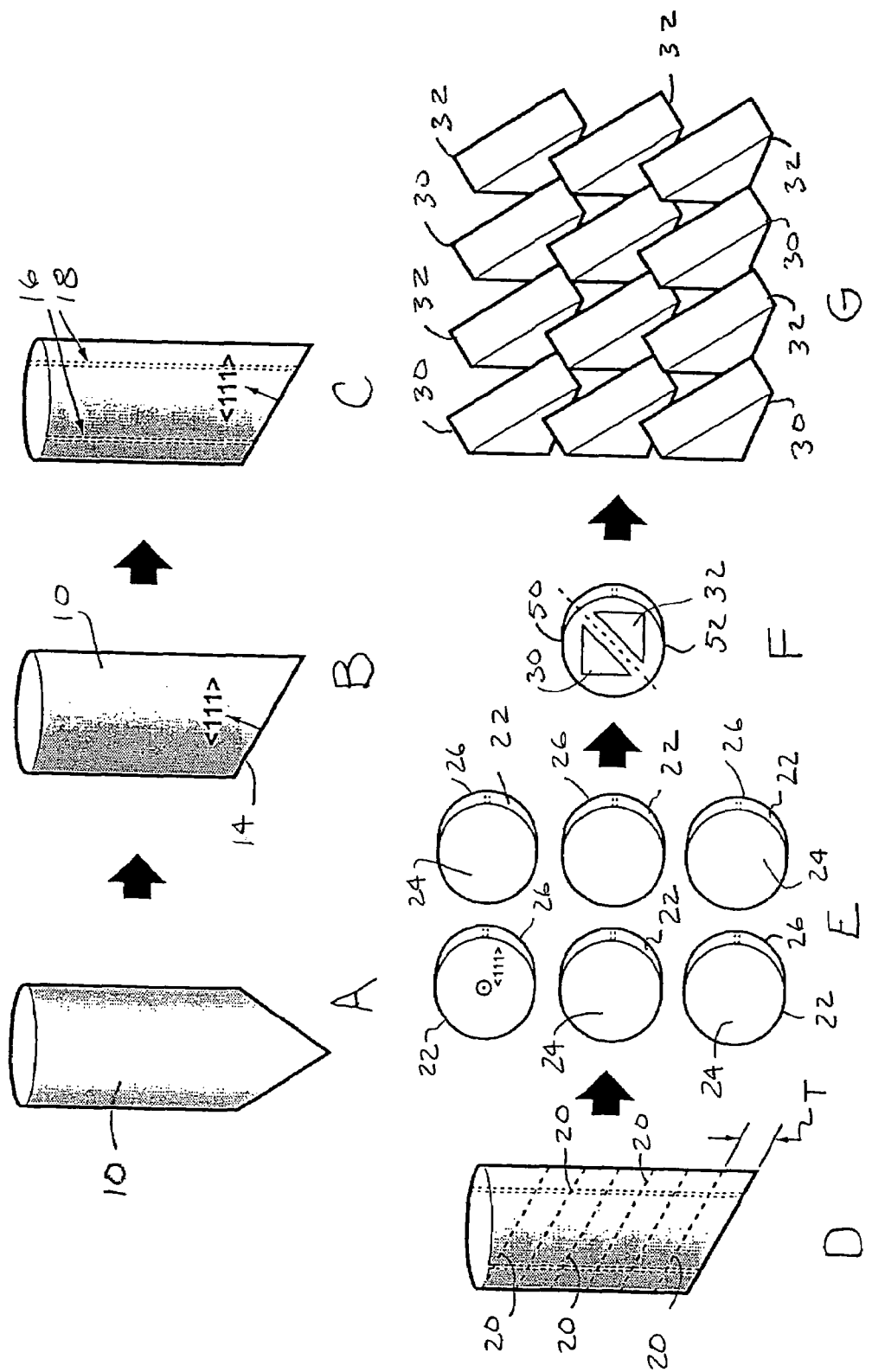
FIG. 1 illustrates a seven step method, designated as steps A-G, for increasing the yield of a cubic crystal rod for forming a plurality of prisms.

A sequence of processing steps laid out in FIG. 1 exemplifies a method for increasing yield of optical elements from a cubic crystal material in accordance with the invention. Beginning with Step A, a crystal rod 10 made of calcium fluoride is grown either with randomly oriented crystal axes or with crystal axes having a preferred orientation imposed by seeding. Either way, the exact orientation of the crystal axes is not immediately apparent from the crystal rod.

In Step B, the crystal rod 10 is cleaved near one end along the {1 1 1} plane normal to the <1 1 1> main axis. In such calcium fluoride crystals, this is the crystal plane along which the crystal most readily breaks and provides a convenient and accurate reference plane 14 for the crystal rod 10. Although the {1 1 1} reference plane 14 identifies one of the crystal axes, i.e., the <1 1 1> main crystal axis, it is necessary to identify a second axis to fully orient the cubic crystal.

Step C involves an inspection procedure for identifying a second crystal axis orthogonal to the <1 1 1> main axis. In particular, a Laue x-ray diffractometer is used to find one of the <1 1 $\bar{2}$>, <1 $\bar{2}$ 1>, or <$\bar{2}$ 1 1> alternative crystal axes. Two orientation labels 16 and 18 are applied to the periphery of the crystal rod 10 to identify the location of one of the <1 1 $\bar{2}$>, <1 $\bar{2}$ 1>, or <$\bar{2}$ 1 1> alternative crystal axes that extends perpendicular to the <1 1 1> main axis. The orientation labels 16 and 18 are preferably drawn on the crystal rod 10 as two diametrically opposed lines.

Using the {1 1 1} reference plane 14 as a reference, parallel cuts 20 are made along the length of the rod 10 as shown in Step D, each at a predetermined thickness "T". The parallel cuts 20 divide the crystal rod 10 into a plurality of slabs in the form of slightly eccentric disks 22 as shown in Step E. For example, the crystal rod 10 can be mounted in a sacrificial plastic holder and loaded into a saw, such as a 1D or diamond saw, and accurately cut onto the plurality of eccentric disks 22. The tops and bottoms of the eccentric disks 22 are then double-side lapped to create highly parallel ground surfaces 24 and 26 in much the same way as optical windows are formed. The top and bottom surfaces 24 and 26 of the disks 22 are ground parallel to the {1 1 1} reference plane 14 coincident with other of the set of parallel {1 1 1} planes. The <1 1 1> main axis extends normal to the cut parallel surfaces 24 and 26 of the disks 22. The <1 1 $\bar{2}$>, <1 $\bar{2}$ 1>, and <$\bar{2}$ 1 1> alternative crystal axes are known to be oriented perpendicular to the <1 1 1> main axis and parallel to the {1 1 1} planes that form the parallel surfaces 24 and 26 of the disks 22. The orientation labels 16 and 18, which are visible on each of the disks 22, identify the orientation of the one <1 1 $\bar{2}$>, <1 $\bar{2}$ 1>, or <$\bar{2}$ 1 1> alternative crystal axis around the <1 1 1> main axis in each of the disks 22.

Figure 2:
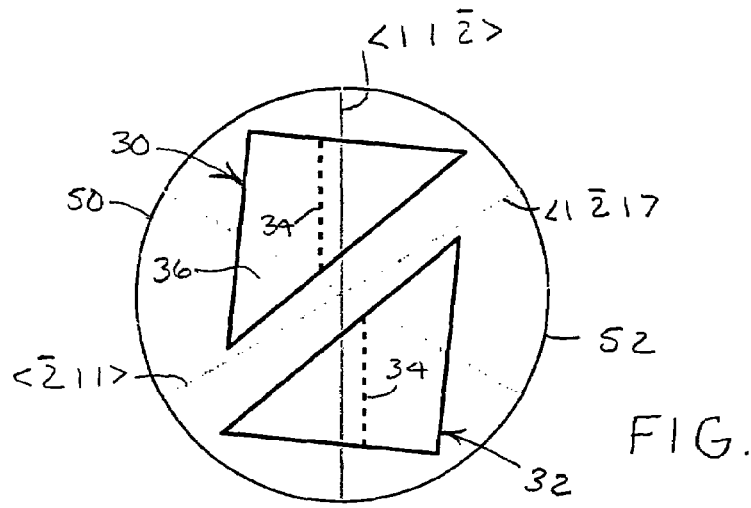
FIG. 2 is an enlargement of a disk from Step F of FIG. 1 showing the traces of two prisms and three alternative crystal axes in the disk.

Once both the <1 1 1> main axis and the one <1 1 $\bar{2}$>, <1 $\bar{2}$ 1>, or <$\bar{2}$ 1 1> alternative crystal axis are known for each of the disks 22, the orientation of the cubic crystal within each of the disks 22 is thoroughly known. FIG. 2 shows an enlargement of the Step F in which the outline of two optical elements in the form of prisms 30 and 32 are drawn on each of the disks 22 in positions that are angularly oriented as desired to the <1 1 $\bar{2}$>, <1 $\bar{2}$ 1>, or <$\bar{2}$ 1 1> alternative crystal axes. Although the orientation labels 16 and 18 only identify one of the <1 1 $\bar{2}$>, <1 $\bar{2}$ 1>, or <$\bar{2}$ 1 1> alternative crystal axes by virtue of its direction across the surfaces 24 and 26 of the disks 22, the other two of the <1 1 $\bar{2}$>, <1 $\bar{2}$ 1>, and <$\bar{2}$ 1 1> alternative crystal axes are also know by geometric reference. Accordingly, the prisms 30 and 32 can be oriented with respect to any one of the <1 1 $\bar{2}$>, <1 $\bar{2}$ 1>, or <$\bar{2}$ 1 1> alternative crystal axes.

Figure 3:
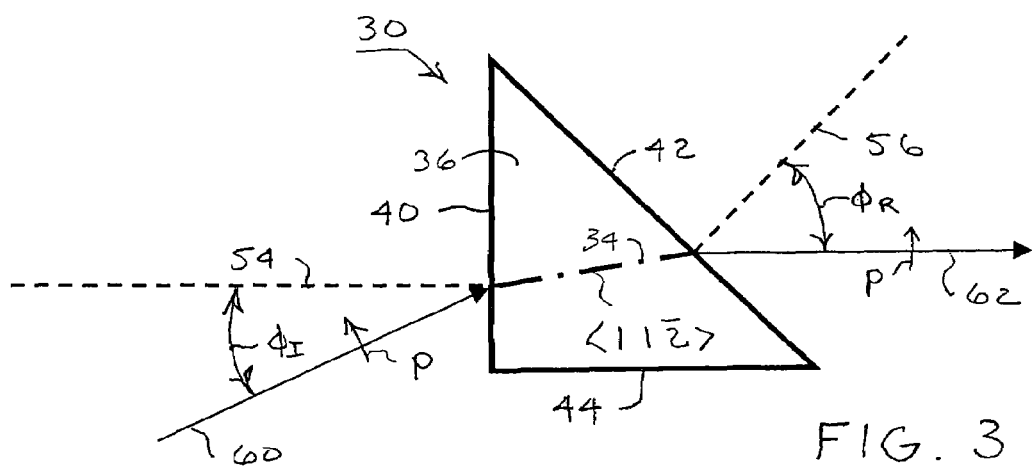
FIG. 3 is a side view of one of the prisms arranged for refracting light along one of the alternative crystal axes.
Figure 4:
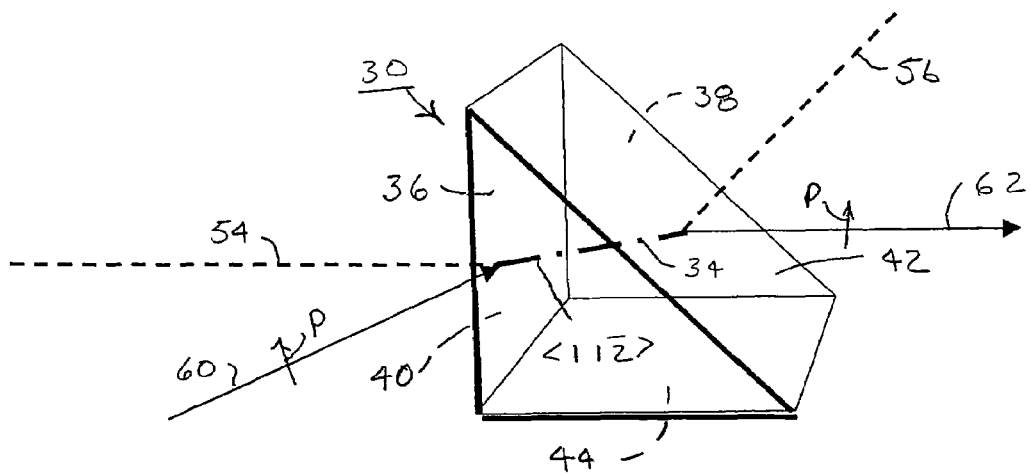
FIG. 4 is a perspective view of the prism of FIG. 3 in wire outline form showing more of the prism surfaces.

As laid out in FIGS. 3 and 4 with respect to the prism 30, each of the prisms 30 and 32 includes two end faces 36 and 38 that correspond to the parallel surfaces 24 and 26 of the disks 22 and that lie in the {1 1 1} crystal planes and three side faces 40, 42, and 44 that extend perpendicular to both the parallel surfaces 24 and 26 of the disks 22 and the {1 1 1} crystal planes. The chosen direction for propagation of light through the prisms 30 and 32 along the <1 1 $\bar{2}$> alternative crystal axis is shown by the dashed lines 34.

Also in step F, the disks 22 are cut in half in a known orientation, such as along or referenced to one of the other <1 $\bar{2}$ 1> or <$\bar{2}$ 1 1> alternative crystal axes—the <1 $\bar{2}$ 1> alternative axis being shown as an appropriate cut line in FIG. 2. Each of the half disks 50 and 52 are finished formed into the prisms 30 and 32. For example, the half disks 50 and 52 can be loaded into a micro-grinding machine, such as grinding machines available from OptoTech Optical Machinery Inc, East Greenville, Pa. or LOH Optical Machinery, Inc., of Milwaukee/Germantown, Wis., and ground into their desired form as the prisms 30 and 32. The result, which is a set of the prisms 30 and 32 finished from a plurality of the disks 22, is shown as the final Step G.

The new method shown in the Steps A-G makes more efficient use of the crystal material of the rod 10 and can be applied to extract similar efficiencies from other cubic crystal bodies and for making other optical elements oriented for propagating light along one of the <1 1 $\bar{2}$>, <1 $\bar{2}$ 1>, or <$\bar{2}$ 1 1> alternative crystal axes. The crystal bodies are cut into slabs having top and bottom surfaces from which two end faces of the optical elements are finished along the {1 1 1} reference planes immediately adjacent to one another. The slabs themselves can be cut apart for finishing adjacent side faces of the optical elements. Slabs (e.g., disks) having larger areas relative to the desired size of the finished optical elements can be cut into more than two parts for forming more than two optical elements from each of the slabs. Generally, the parts are cut into subparts for forming even numbers of optical elements from each of the slabs, each subsequent cut being a complete cut that divides the remainder by half.

The side faces 40, 42, and 44 of the prisms 30 are oriented during use as shown in FIGS. 3 and 4 so that the side face 40 functions as an entrance surface, the side face 42 functions as an exit surface, and the side face 44 functions as a base. Normals 54 and 56 of the entrance and exit surfaces 40 and 42 are inclined to both the directions 60 and 62 of light propagation to and from the prism 30 and the <1 1 $\bar{2}$> alternative crystal axis along which the light is intended for propagation through the prism 30. The inclination of the normal to the entrance surface 40 with respect to the direction 60 of light propagation to the entrance surface 40 through the angle "$\phi_I$" avoids unwanted retroreflections of the light from the entrance surface 40. The normals 54 and 56 are preferably inclined true length within the {1 1 1} plane (the plane of FIG. 3) so that the entrance and exit surfaces 40 and 42 remain perpendicular to the {1 1 1} crystal plane. Thus, the angles "$\phi_I$" of incidence and "$\phi_R$" of refraction also remain in the {1 1 1} crystal plane.

Although the <1 1 $\bar{2}$>, <1 $\bar{2}$ 1>, and <$\bar{2}$ 1 1> alternative crystal axes exhibit an intrinsic birefringence, the effects of the birefringence can be avoided by limiting electric field fluctuations of light propagating along the <1 1 $\bar{2}$>, <1 $\bar{2}$ 1>, or <$\bar{2}$ 1 1> alternative crystal axes to within the {1 1 1} plane. In other words, the propagating light is linearly polarized and the direction of polarization is within the {1 1 1} plane. The polarization direction is also preferably within the plane of incidence at which the polarized light strikes the entrance surface 40, and is therefore referenced as "P" polarized light. The normal to the entrance surface 40 is inclined to the one <1 1 $\bar{2}$>, <1 $\bar{2}$ 1>, or <$\bar{2}$ 1 1> alternative crystal axis through the angle of refraction "$\phi_R$" so that upon refraction through the entrance surface 40, the "P" polarized light propagates along the one <1 1 $\bar{2}$>, <1 $\bar{2}$ 1>, or <$\bar{2}$ 1 1> alternative crystal axis.

In practice, the light emitted by conventional lasers, including lasers operating in the deep UV, is not perfectly collimated, and is, therefore, more accurately referred to as "highly" collimated light. For example, emission angles of +/−6 degrees are within the range of normal expectations for the highly collimated light, although higher or lower emission angle ranges are possible depending upon the choice of light source. The <1 1 $\bar{2}$>, <1 $\bar{2}$ 1>, and <$\bar{2}$ 1 1> alternative crystal axes also define directions of propagation through the cubic crystal material that accommodate such variations in ray angle with minimum of polarization conversion of the light propagating through the prisms 30 from linearly polarized light to polarized light in a different form (e.g., elliptical or rotated). In other words, substantially linearly polarized light incident upon the prisms 30 exits the prisms 30 as substantially the same linearly polarized light despite small variations in ray angle.

In addition to the intrinsic birefringence effects dealt with by orientations of both ray angle and polarization, such cubic crystal materials are also subject to stress birefringence that can affect the polarization of light propagated through the crystals. For example, two main sources of stress birefringence in calcium fluoride crystals are (a) birefringence created during the crystal growth process and modified during the cutting in polishing of the optical elements, and (b) birefringence created by heat gradients in the optics during their use. Among the possible directions of propagation through the cubic crystal material perpendicular to the <1 1 1> axis, the <1 1 $\bar{2}$>, <1 $\bar{2}$ 1>, and <$\bar{2}$ 1 1> alternative crystal axes are least sensitive to the birefringence effects of stress. In fact, the amount of stress-induced polarization conversion associated with propagations along the <1 1 $\bar{2}$>, <1 $\bar{2}$ 1>, and <$\bar{2}$ 1 1> alternative crystal axes is expected to be roughly comparable or even less than the amount of stress-induced polarization conversion associated with propagations along the <1 1 1> axis over a modest range of stress magnitudes (e.g., less than 100 kPa). For purposes of making the comparison, a fixed value of the stress magnitude is considered over a full range of orientations to identify the maximum polarization conversion associated with propagations along the <1 1 1> main crystal axis and the <1 1 $\bar{2}$>, <1 $\bar{2}$ 1>, and <$\bar{2}$ 1 1> alternative crystal axes.

The invention is particularly applicable for use in line-narrowing modules for laser systems operating at wavelengths around 157 nm or 193 nm. Highly polarized light propagates through a series of prisms traveling in one direction through the prisms on a first pass and traveling in nearly the opposite direction through the prisms in a second pass to provide effective feedback for the lasers. For example, excimer lasers made by Lambda Physik of Göttingen, Germany and Cymer, Inc. of San Diego, Calif. produce linearly polarized light, regarded as "P" polarized within the plane of light ray travel. A series of prisms made in accordance with the invention can be used to convey the "P" polarized light within the laser cavity with a minimum of polarization conversion (e.g., "P" polarized converted into "S" polarized light) due to both intrinsic or stress-induced birefringence. Performance comparable to propagations along <1 1 1> crystal axes can be achieved in the new prism designs by propagating the "P" polarized light along one of the <1 1 $\bar{2}$>, <1 $\bar{2}$ 1>, or <$\bar{2}$ 1 1> alternative crystal axes, while increasing the number of such prisms that can be harvested from a crystal body.

Although described with respect to particular embodiments, which are intended to be illustrative rather than limiting, it will be apparent that numerous variations and modification of these embodiments can be practiced within the scope of the appended claims.

The invention claimed is:

1. A method of making a plurality of optical elements from a cubic crystalline body comprising the steps of:

identifying a primary crystal plane at which the body is prone to cleaving;

identifying an alternative crystal plane perpendicular to the primary plane;

severing the body substantially parallel to the primary plane to produce a plurality of commonly oriented slabs having top and bottom surfaces connected by peripheral surfaces corresponding to a peripheral surface of the crystal body; and finishing the peripheral surfaces of the commonly oriented slabs to produce at least one optical surface in each of the slabs that is oriented substantially perpendicular to the primary crystal plane at a predetermined inclination to the alternative plane.

2. The method of claim 1 in which the step of severing the body substantially parallel to the primary crystal plane produces peripheral surfaces that are not perpendicular to the primary crystal plane.

3. The method of claim 1 including a further step of finishing the top and bottom surfaces of the commonly oriented slabs to produce substantially plane-parallel optical surfaces substantially parallel to the primary crystal plane.

4. The method of claim 3 in which the step of finishing the peripheral surfaces of the commonly oriented slabs includes producing a plurality of optical surfaces in each of the slabs oriented substantially perpendicular to the primary crystal plane for making optical elements that include two optical surfaces that extend substantially parallel to the primary crystal axis and a plurality of optical surfaces that extend substantially perpendicular to the primary crystal axis.

5. The method of claim 1 in which the one optical surface is produced as a first of a plurality of optical surfaces in each of the slabs oriented substantially perpendicular to the primary crystal plane, and the first of the optical surfaces is inclined to the alternative crystal plane by an amount that refracts light entering the optical element along a crystal axis normal to the alternative crystal plane.

6. The method of claim 1 including a further step of cutting the commonly oriented slabs through both the top and bottom surfaces of the slabs into at least two parts.

7. The method of claim 6 in which the step of finishing the peripheral surfaces of the commonly oriented slabs includes producing at least one optical surface in each of the two parts of the slabs oriented substantially perpendicular to the primary crystal plane.

8. The method of claim 7 in which the step of finishing the peripheral surfaces of the commonly oriented slabs includes producing a plurality of optical surfaces in each of the parts of the slabs oriented substantially perpendicular to the primary crystal plane for making other optical surfaces oriented substantially parallel to the primary crystal plane.

9. The method of claim 1 in which the cubic crystalline body is made of calcium fluoride.

10. The method of claim 9 in which the primary crystal plane is oriented normal to a <1 1 1> crystal axis.

11. The method of claim 10 in which the alternative crystal plane is oriented normal to one of a <1 1 $\bar{2}$>, <1 $\bar{2}$ 1>, and <$\bar{2}$ 1 1> crystal axis.

12. The method of claim 11 in which the one optical surface is inclined to the alternative crystal axis such that an intended propagation direction of light through the optical element lies along the one of the <1 1 $\bar{2}$>, <1 $\bar{2}$ 1>, and <$\bar{2}$ 1 1> crystal axes.

13. The method of claim 1 in which the step of identifying the primary crystal plane includes cleaving the body along the primary crystal plane at which the body is prone to breakage.

14. The method of claim 1 in which the step of identifying the alternative crystal plane includes using interference to identify lattice planes in the cubic crystalline body.

15. The method of claim 14 which the step of identifying the alternative crystal plane includes using x-ray diffraction to identify the orientation of the atomic planes in the cubic crystalline body corresponding to the alternative crystal plane.

16. The method of claim 14 including an additional step of applying an orientation label to the crystalline body to indicate the orientation of the alternative crystal plane.

17. The method of claim 16, in which the step of applying an orientation label includes applying marks that are apparent on each of the slabs severed from the crystalline body.

18. The method of claim 17 in which the marks are applied to the crystalline body as parallel lines.

19. The method of claim 18 in which the step of dividing includes dividing up the crystalline body substantially parallel to the primary crystal plane to produce a plurality of parts having top and bottom surfaces connected by peripheral surfaces that correspond to a peripheral surface of the crystalline body.

20. The method of claim 18 in which the step of referencing includes cleaving the crystalline body along the main crystal axis, and the step of dividing includes cutting the crystalline body substantially parallel to the main crystal axis to form a plurality of parts.

21. The method of claim 18 in which the at least one surface substantially perpendicular to the primary crystal plane is inclined with respect to the alternative crystal plane about the <1 1 1> main crystal axis so that a collimated beam of light is bent to its intended direction of propagation of light through each of the optical elements along the one of the <1 1 $\bar{2}$>, <1 $\bar{2}$ 1>, and <$\bar{2}$ 1 1> alternative crystal axes.

22. The method of claim 21 in which the step of dividing includes cutting the parts into at least two subparts and each of the subparts being fashioned into one of the optical elements.

23. The method of claim 22 including a further step of marking the crystalline body for referencing the alternative crystal plane.

24. The method of claim 23 in which at least one the markings appear on each of the subparts from which the optical elements are fashioned.

25. A method of making a plurality of optical elements from a cubic crystalline body comprising the steps of:

referencing the crystalline body with respect to a primary crystal plane that is oriented normal to a <1 1 1> main crystal axis;

inspecting the crystalline body to determine an orientation of an alternative crystal plane normal to one of a <1 1 $\bar{2}$>, <1 $\bar{2}$ 1>, and <$\bar{2}$ 1 1> alternative crystal axis;

dividing the crystalline body into a plurality of optical elements each having at least one surface substantially parallel to the primary crystal plane and at least one surface substantially perpendicular to the primary crystal plane; and the at least one surface substantially perpendicular to the primary crystal plane being oriented with respect to the alternative crystal plane so that an intended direction of propagation of light through each of the optical elements is along the one of the <1 1 $\bar{2}$>, <1 $\bar{2}$ 1>, and <$\bar{2}$ 1 1> alternative crystal axes.

26. The method of claim 25 in which the optical elements have two surfaces substantially parallel to the primary crystal plane, and the step of dividing includes finishing the top and bottom surfaces of the parts substantially parallel to the primary crystal plane to form the two surfaces of the optical elements that are substantially parallel to the primary crystal plane.

27. The method of claim the 25 in which the step of dividing includes dividing the parts into at least two subparts, and each of the two subparts being further fashioned into one of the optical elements.

28. The method of claim 25 in which the optical elements have at least two surfaces substantially perpendicular to the primary crystal plane, and the step of dividing includes finishing the peripheral surfaces of the parts substantially perpendicular to the primary crystal plane to form the at least two surfaces of the optical elements that are substantially perpendicular to the primary crystal plane.

29. The method of claim 28 in which each of the two subparts includes a portion of the top and bottom surfaces of the parts along with a portion of the peripheral surfaces of the parts.

30. The method of claim 28 in which each of the two subparts is fashioned into a prism having two optical surfaces substantially parallel to the primary crystal plane and at least three optical surfaces substantially perpendicular to the primary crystal plane.

* * * * *